United States Patent
Wang et al.

(10) Patent No.: US 7,122,262 B2
(45) Date of Patent: Oct. 17, 2006

(54) MINIATURE FUEL CELL SYSTEM HAVING INTEGRATED FUEL PROCESSOR AND ELECTRONIC DEVICES

(76) Inventors: Guan-Wu Wang, 554 Hilbar La., Palo Alto, CA (US) 94303; Weiping Wang, 4044 Sutherland Dr., Palo Alto, CA (US) 94303

( * ) Notice: Subject to any disclaimer, the term of this patent is extended or adjusted under 35 U.S.C. 154(b) by 547 days.

(21) Appl. No.: 10/302,313

(22) Filed: Nov. 22, 2002

(65) Prior Publication Data

US 2003/0170515 A1  Sep. 11, 2003

Related U.S. Application Data

(60) Provisional application No. 60/361,413, filed on Mar. 5, 2002.

(51) Int. Cl.
*H01M 8/18* (2006.01)

(52) U.S. Cl. .............. 429/20; 429/19; 429/26

(58) Field of Classification Search .............. None
See application file for complete search history.

(56) References Cited

U.S. PATENT DOCUMENTS

| 4,977,041 A | 12/1990 | Shiozawa |
|---|---|---|
| 6,183,703 B1 | 2/2001 | Hsu |
| 6,203,587 B1 | 3/2001 | Lesieur |
| 6,248,461 B1 * | 6/2001 | Abe et al. .............. 429/22 |

\* cited by examiner

*Primary Examiner*—Patrick Joseph Ryan
*Assistant Examiner*—Julian Mercado
(74) *Attorney, Agent, or Firm*—Tran & Associates

(57) ABSTRACT

A fuel cell system comprises a fuel processor, a fuel cell, a heat-generating electronic device and a thermally conductive component. The fuel processor receives fuel and outputs hydrogen. The fuel cell receives hydrogen from the fuel processor and outputs electric current. A heat-generating electronic device receives the electric current from the fuel cell. A thermally conductive component is in thermal connection with the heat-generating electronic device and the fuel processor.

20 Claims, 1 Drawing Sheet

MINIATURE FUEL CELL SYSTEM HAVING INTEGRATED FUEL PROCESSOR AND ELECTRONIC DEVICES

This application claims priority to Provisional Application Ser. No. 60/361,413, filed on Mar. 5, 2002 and entitled "MINIATURE FUEL CELL SYSTEM HAVING INTEGRATED FUEL PROCESSOR AND ELECTRONIC DEVICES", the content of which is hereby incorporated by reference.

BACKGROUND

This application relates to a fuel-cell system supplying electricity to electronic devices.

Fuel cell converts fuels directly into electricity by means of chemical reaction. A preferred fuel cell is a hydrogen fuel cell that uses hydrogen and oxygen to produce electricity. The fuel cell may comprise a stack of phosphoric acid fuel cells or a plurality of solid membrane electrode assembly fuel cells, for example solid polymer fuel cells. Typically, in order to use more conveniently available fuel such as methanol, the system may need a fuel processor, also known as reformer, to convert a methanol into hydrogen for subsequent usage. If such a system of fuel cell is miniaturized, it can be used to replace the battery, entirely or part thereof, and eliminate recharging common to laptop computers or cellular phones.

Typically, a fuel processor must be operated at elevated temperature to work properly. The ability to miniature the fuel cell system thus has been limited by complex thermal and scale factors. A different approach to shrink the size fuel cell system has led to invention such as direct conversion of alcohol to electricity. However, direct fuel cell requires multi-layers of different catalytic films with complex fluid delivering mechanism which reduces overall efficiency of the system.

SUMMARY

Implementations of the system may include one or more of the following. The invention system generally includes a) a fuel processor that for receives fuel and outputs hydrogen, b) a fuel cell that receives hydrogen from the fuel processor and outputs electric current, c) a power conditioning device that conditions the electric current, d) a rechargeable battery that is charged by the electric current, e) a switch device, f) a heat-generating electronic device that consumes power provided by the rechargeable battery, and g) a thermally conductive component in thermal connection with the heat-generating electronic device and the fuel processor.

In one aspect, a fuel-processor system, including a fuel processor that receives fuel and outputs hydrogen and a heat-generating electronic device in substantially thermal connection with the fuel processor. In another aspect, a thermally conductive component is provided to be in thermal connection with the heat-generating electronic devices and the fuel processor.

In yet another aspect, the present invention relates to a fuel-cell system for supplying electricity to electronic devices. It consists of a fuel cell, a fuel processor for generating hydrogen, and the electricity-consuming devices that generates heat as a by-product. Through heat coupling means, the heat generated by the electronic device provides the temperature necessary for fuel processor to convert fuels, such as methanol, to hydrogen. The hydrogen then is used by a fuel cell to catalytically react with the oxygen to generate electricity. The electricity generated by the fuel cell is, in turn, used to power the electronic device. In operating states in which the heat generated by the electronic device is insufficient for the reformer, auxiliary power from rechargeable battery for can be supplied by automated means.

An advantage of the present invention is that the temperature of the fuel processor is effectively elevated by the heat dissipation from heat-generating electronic device. The energy required for heating is the fuel processor is therefore reduced.

Another advantage of the present invention is that the fuel cell, the fuel processor can be integrated with electronic devices in a miniature scale. The invention system can be fabricated using a Micro-Electro-Mechanical System (MEMS) devices. The invention system is suitable to portable electronic devices such as laptop computer, Personal Digital Assistant (PDA) and cell phones.

Yet another advantage of the invention is that the energy waste is reduced by effectively utilizing the heat dissipation from heat-generating electronic device for elevating temperature in the fuel processor. The energy efficiency is therefore increased.

Still another advantage of the invention is that a cooling mechanism is provided to the heat-generating electronic device by transferring heat from the heat-generating electronic device to the fuel processor.

Yet another advantage of the invention is that the start time of the fuel processor is reduced by auxiliary electric heating source.

The details of one or more embodiments are set forth in the accompanying drawing and in the description below. Other features, objects, and advantages of the invention will become apparent from the description and drawings, and from the claims.

BRIEF DESCRIPTION OF THE DRAWINGS

The accompanying drawing, which are incorporated in and form a part of this specification, illustrate embodiments of the invention and, together with the description, serve to explain the principles of the invention.

DESCRIPTION OF INVENTION

Figure 1:
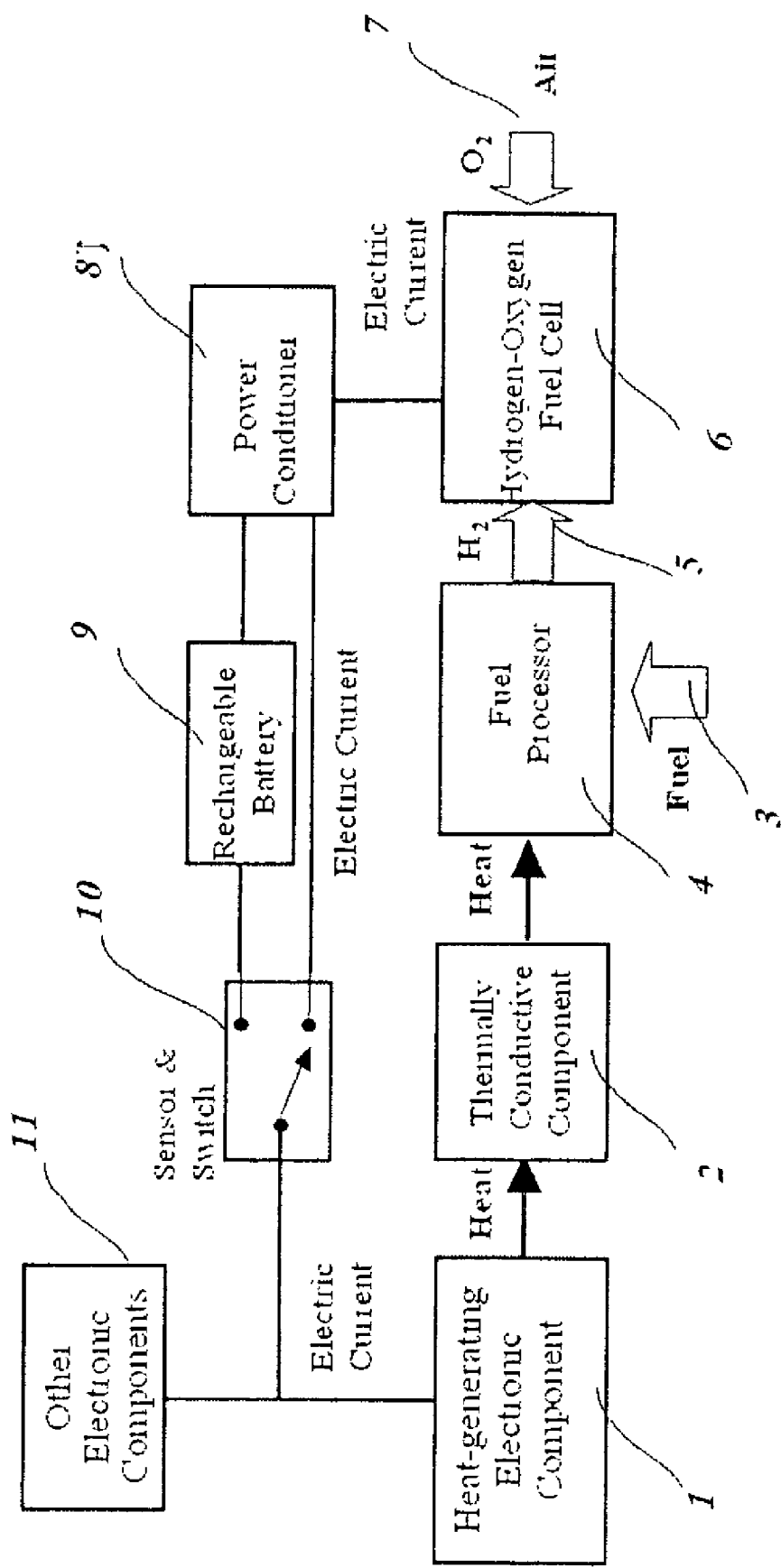
FIG. 1 is a block diagram of a fuel cell system having integrated fuel processor and electronic devices in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

This invention is a miniaturized fuel cell system with a novel fuel processor that is heated by electricity-consuming electronic device that produces heat as a byproduct. The fuel processor and electronic components are integrated structurally and thermally so the heat from the electronic device can be transferred to the fuel processor. Such system can be used for laptop computer, cellular phones and other portable power electronics, taking advantage of their high-power components that produce large amount of heat.

Shown in FIG. 1 is the diagram of the fuel cell system. The system includes a heat-generating electronic device 1. The heat-generating electronic device can include one or more resistors, transistors, diodes, capacitors, and inductors. The heat-generating electronic device can also include semiconductor integrated circuits. Preferred heat-generating electronic devices can include Central Processor Units (CPU), Digital Signal Process (DSP), Power Amplifier, and a data storage device such as volatile and non-volatile memories. The heat-generating electronic device can also include mobile communication devices such as cellular phones, wireless-capable laptop computers, and vehicle wireless communication devices. It is well known that various electronic devices as described can generate significant amount of heat under normal operating conditions. For example, a CPU operating above 1 GHz can produce more than 50W of thermal heat that must be dissipated.

In accordance to an embodiment of the present invention, the heat is coupled through a thermally conductive component 2, or a heat exchanger, to the fuel processor 4. The fuel 3, such as methanol, is provided externally to the fuel processor 4. Inside the heated fuel processor 4, methanol and water is vaporized and chemically transformed to hydrogen gas 5 and carbon dioxide through a catalyst. Details of fuel-processor designs are disclosed in U.S. Pat. Nos. 6,203,587 B1 and 6,183,703 B1, the disclosures of which are herein incorporated by reference.

In another embodiment of the present invention, the heat-generating electronic device 1 is in direct contact or in close vicinity of the fuel processor 4, without a thermally conductive component 2. Heat is transferred between the heat-generating electronic device 1 and the fuel processor 4 by thermal conduction, thermal diffusion, or thermal convection.

With or without the thermally conductive component, the heat-generating electronic device 1 is always in substantially thermal connection with the fuel processor 4. In accordance to the present invention, the terms "thermal connection", "substantially thermal connection" and "thermal coupling" are used to refer to effective thermal conductivity between two or more components involved. The mode of heat transfer can include one or more of thermal conduction, thermal diffusion, and thermal convection.

The hydrogen gas 5 is fed to the hydrogen-oxygen fuel cell 6 to react with the oxygen 7 from an oxygen source such as the air. One particular type of the fuel cell uses proton exchange membrane sandwiched between two electrodes. In operation, hydrogen enters the anode, and it separates into proton and electron under the assistance of a catalyst. The proton diffuses through the membrane and reacts with oxygen in the cathode to produce water. The electron goes through external circuit as electric current that can be utilized before returning the cathode.

The electricity generated may go through a circuit of power conditioner 8 for proper voltage and other required electrical characteristics. A small rechargeable battery 9 can be used as the auxiliary power. In operating conditions such as start-up, idle mode or when heat generated by the heat-generating electronic device 1 is insufficient for the fuel processor, auxiliary power can be supplied. The control of electric power can be achieved by switch and sensor 10 that monitors reformer temperature and circuit conditions. The electric current is supplied to the heat-generating electronic device 1 and other part of electric components 11 of the equipment.

In another embodiment of the present invention, the heat-generating electronic device 1 can be a resistive heater that is dedicated for providing heat to the fuel processor 4. The resistive heater can embedded inside the fuel processor 4 or in substantial thermal connection (e.g. in contact with) with the fuel processor 4 to increase thermal efficiency. The resistive heater can be turned on when there is a sudden increase in the load, for example, at the start-up or to preheat the fuel processor 4, before heat is generated by any heat-generating electronic components in the load circuits. The resistive heater can also be used whenever the sensor 10 detects the temperature of the fuel processor to be below a pre-determined temperature during operation.

In an embodiment of the present invention, the fuel 3 supplied to fuel processor 4 can be regulated by a fuel-flow regulator. The fuel-flow regulator can further respond to the temperature and other operation status of the heat-generating electronic device 1. The fuel supply can be turned on only when there is significant heat generated by the heat-generating electronic device 1. The thermal efficiency of the fuel cell system is therefore maximized.

Structurally, the fuel processor 4, the heat coupling means 3, the heat-generating electronic device 1 can be produced as an integrated, miniature unit using predominant micro-electronic fabrication technology such MEMS. The integrated fuel cell system recycles the waste heat from the heat-generating electronic device 1 to reform fuel for usage by fuel cell, thus improving overall efficiency. In accordance to the present invention, the fuel processor, fuel cell, and the thermally conductive component can be arranged in the form a stack of substantially parallel cells or chambers and parallel layers. Details of fuel-processor designs are disclosed in U.S. Pat. Nos. 4,977,041, 6,203,587 B1 and 6,183,703 B1, the disclosures of which are herein incorporated by reference.

In a preferred embodiment of this invention is, integrated fuel processor with the heat-generating electronic device 1 such as a CPU and a wireless communication device can be fabricated using micro-electronic fabrication technologies such as Micro-Electro-Mechanical System (MEMS) devices. By means of thermal coupling, the heat from the heat-generating electronic device 1 can be used to raise the temperature of fuel processor suitable for generating hydrogen. The heat-generating electronic device 1 can also be effectively cooled by this thermal coupling. In accordance to the present invention, the fuel-cell system based on MEMS devices is ideal for application in portable electronic devices.

In accordance to the present invention, the term "wireless communication device" refers an electronic device that is capable of receiving and transmitting wireless signals in a wireless mode. Wireless communications can occur at a wide range of frequencies using different wireless communication protocols. Common communications standards and protocols include Global System for Mobile Communications (GSM), General Packet Radio Service (GPRS), Enhance Data Rates for GSM Evolution (Edge) and Bluetooth™, IEEE802.11 (a, b, g, etc.).

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A fuel cell system, comprising
 a) a fuel processor that receives fuel and outputs hydrogen;
 b) a fuel cell that receives hydrogen from the fuel processor and outputs electric current; and
 c) a heat-generating electronic device that receives the electric current, wherein the heat-generating electronic device is in direct thermal connection with the fuel processor to heat the fuel processor, wherein the direct thermal connection is a thermally conductive component in thermal connection between the heat-generating electronic device and the fuel processor.

2. The fuel cell system of claim 1, wherein the direct thermal connection transfers heat from the heat-generating electronic device to the fuel processor.

3. The fuel cell system of claim 1 wherein the beat-generating electronic device includes one or more of resistors, transistors, diodes, capacitors, inductors.

4. The fuel cell system of claim 1 wherein the heat-generating electronic device includes one or more semiconductor integrated circuits.

5. The fuel cell system of claim 4 wherein the semiconductor integrated circuits include one or more of Central Processor Units (CPU), Digital Signal Process (DSP), Power Amplifier, routers, and data storage devices.

6. The fuel cell system of claim 1 wherein the heat-generating electronic device includes one or more wireless communication devices.

7. The fuel cell system of claim 1 further comprising one or more Micro-Electro-Mechanical System (MEMS) devices.

8. The fuel cell system of claim 1 wherein at least one of the fuel processor, fuel cell, and the thermally conductive component is arranged in the form a stack of substantially parallel cells and layers.

9. The fuel cell system of claim 1 wherein the fuel cell receives oxygen from an oxygen source.

10. The fuel cell system of claim 1, further comprising
 d) a power conditioning device.

11. The fuel cell system of claim 1, further comprising
 d) a rechargeable battery.

12. The fuel cell system of claim 1, further comprising
 d) a switch device, including optionally a sensor.

13. The fuel cell system of claim 1, further comprising
 d) a regulator that controls the fuel supply to the fuel processor.

14. The fuel cell system of claim 13 wherein the fuel regulator is responsive to the operation status of the heat-generating electronic device.

15. The fuel cell system of claim 1 wherein the heat-generating electronic device is a resistive heater that is dedicated for providing heat to the fuel processor.

16. A fuel cell system, comprising
 a) a fuel processor that receives fuel and outputs hydrogen;
 b) a fuel cell that receives hydrogen from the fuel processor and outputs electric current;
 e) a power conditioning device that conditions the electric current;
 d) a switch for controlling the electric current
 e) a heat-generating electronic device that receives the electric current and produces heat; and
 f) a thermally conductive component in direct thermal connection with the heat-generating electronic device and the fuel processor to heat the fuel processor.

17. A fuel processor system, comprising
 a) a fuel processor that receives fuel and outputs hydrogen; and
 b) a heat-generating electronic device in direct thermal connection with the fuel processor to heat the fuel processor, wherein the direct thermal connection is a thermally conductive component in thermal connection between the heat-generating electronic device and the fuel processor.

18. The fuel cell system of claim 17 wherein the heat-generating electronic device includes semiconductor integrated circuits including one or more of Central Processor Units (CPU), Digital Signal Process (DSP), routers, data storage devices, and power amplifiers.

19. The fuel cell system of claim 17 wherein the heat-generating electronic device includes one or more wireless communication devices.

20. The fuel processor system of claim 17, wherein the direct thermal connection transfers heat.

* * * * *